United States Patent [19]

Tsujimura et al.

[11] Patent Number: 4,853,731
[45] Date of Patent: Aug. 1, 1989

[54] AUTOFOCUS CAMERA HAVING AUTOMATIC FOCUS ADJUSTMENT APPARATUS

[75] Inventors: Masao Tsujimura; Masamichi Hirooka; Kazuo Ishikawa, all of Tokyo; Takayoshi Morooka; Masaki Noda, both of Okaya; Mamoru Akiyama, Tokyo; Nobuaki Murai; Seiji Yoshikawa, both of Okaya, all of Japan

[73] Assignee: Kyocera Corporation, Kyoto, Japan

[21] Appl. No.: 232,327

[22] Filed: Aug. 12, 1988

[30] Foreign Application Priority Data

Aug. 28, 1987 [JP] Japan ............................ 62-214361
Sep. 28, 1987 [JP] Japan ............................ 62-242981
Sep. 28, 1987 [JP] Japan ............................ 62-242982
Nov. 20, 1987 [JP] Japan ............................ 62-294519

[51] Int. Cl.$^4$ ............................................. G03B 3/00
[52] U.S. Cl. ................................... 354/400; 354/412; 354/195.1; 354/173.1; 354/173.11; 354/204
[58] Field of Search ............... 354/400, 412, 195.1, 354/173.1, 173.11, 204

[56] References Cited

U.S. PATENT DOCUMENTS

4,541,702 9/1985 Momose et al. .................... 354/400
4,591,257 5/1986 Sawano ............................. 354/403

Primary Examiner—Russell E. Adams
Attorney, Agent, or Firm—Spensley Horn Jubas & Lubitz

[57] ABSTRACT

An autofocus camera has a photographing lens, a shutter normally urged in a shutter opening direction and arranged to be opened and closed after it has once been closed prior to a photographing operation, a mirror movable between a view position which allows light passing through the lens and the shutter to be transmitted to a viewfinder optical system and an exposure position which allows light passing through the photographing lens and the shutter to be transmitted to the surface of a film, and an automatic focus adjustment apparatus for automatically adjusting the position of the lens. The autofocus camera has a motor-drive control circuit arranged to close the shutter prior to a photographing operation, move the mirror from the view position to the exposure position, cause the shutter to be opened and closed for exposure of the film, cause the film to be wound immediately after completion of the operation of the shutter, move the mirror from the exposure position to the view position, cause the shutter to be opened after the winding of the film has temporarily been stopped, and restart the winding of the film.

5 Claims, 9 Drawing Sheets

FIG. I

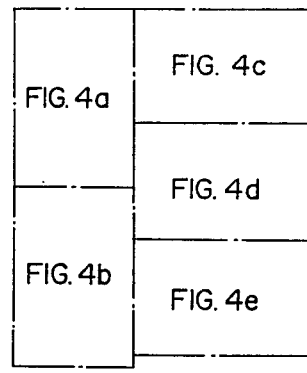
FIG. 4a
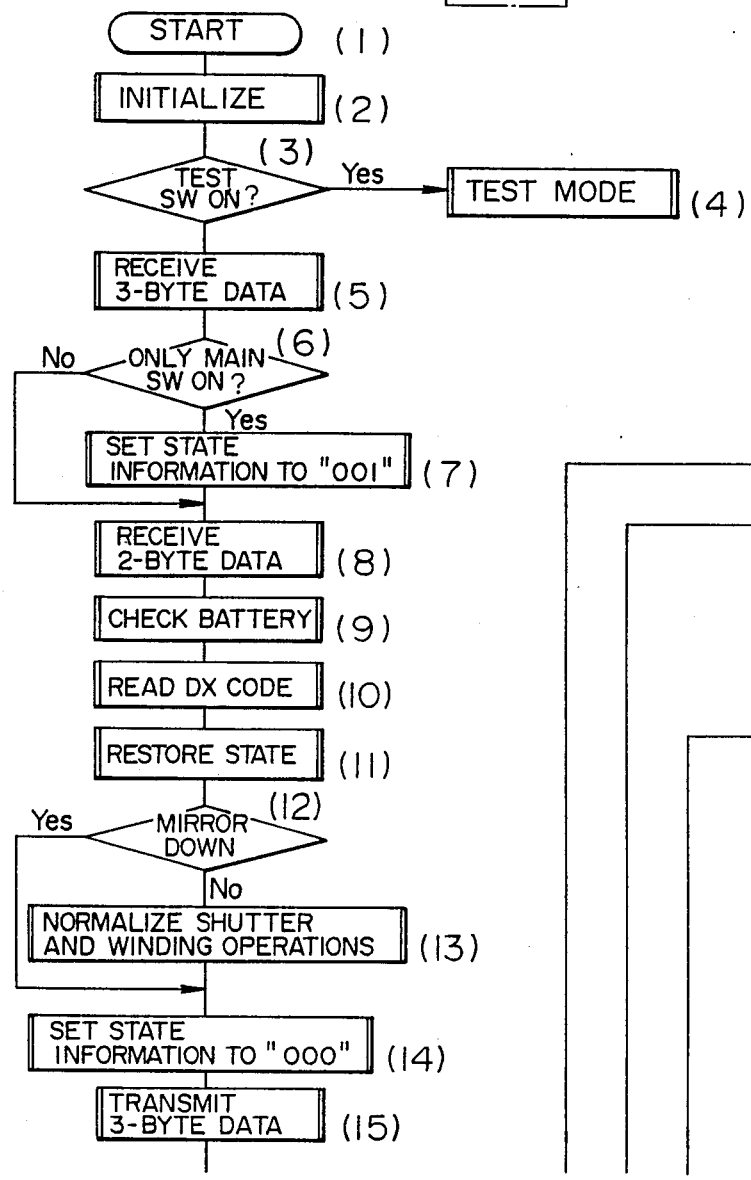

AUTOFOCUS CAMERA HAVING AUTOMATIC FOCUS ADJUSTMENT APPARATUS

BACKGROUND OF THE INVENTION

1. Field of the Invention

The present invention relates generally to cameras of the motor-drive type that includes an automatic exposure control apparatus, an automatic focus adjustment apparatus, a lens shutter and a TTL viewfinder. More specifically, the invention relates to a camera having an improved automatic focus adjustment apparatus which includes an improved motor drive circuit for driving a film, an improved autofocus system and an improved lens position setting system which functions when autofocus is impossible.

2. Description of Related Art:

It has been proposed to provide a camera which has both a lens shutter and a TTL viewfinder.

Such a camera is disclosed in Japanese Patent Publication No. sho 56-5975. This prior art camera is arranged such that a film is manually wound and rewound.

It has also been proposed to provide cameras in which both shutter charging and film winding and rewinding are motorized. Cameras whose focus can be automatically adjusted are also available.

However, if such a camera having a lens shutter and a TTL viewfinder is to be combined with an automatic focus adjustment apparatus and a plurality of motors for driving the autofocus apparatus and the mechanism of each portion of the camera, various problems will be encountered in connection with the capacity of the power source, the distribution of the output of each motor and the like. Also, like the viewfinder of a TTL-type SLR cameras, it is undesirable that, while a user is taking photographs using the above camera having a lens shutter and a TTL viewfinder, the visual field in the viewfinder be blocked for a long time.

Second, if, for example, a subject has a low contrast, a conventional type of autofocus camera may be unable to measure the distance. To cope with this problem, it has been proposed to provide a camera arranged to issue a warning of its inability to measure distance or a camera arranged to set its photographing lens to a predetermined distance. However, these conventional cameras have the problem that, if it is desired to take a photograph in a situation in which distance measurement is impossible, the photographing lens cannot be set to a distance suitable for the brightness of a subject since the photographing lens is fixed to a predetermined distance in such a situation.

Third, in general, a conventional type of autofocus camera is arranged so that its photographing lens will not accidentally move and so that, at the time of photography, it can be switched to a movable state by a switching mechanism. Also, if such an autofocus camera adopts a triangulation system or a coding system in which the distance of the photographing lens can be read using a value representing the movement of the photographing lens which movement is coded with reference to infinity or the closest distance, flash photography can be carried out utilizing the distance represented by such a code.

However, in a phase-difference distance measurement type of autofocus camera which includes no switching mechanism between autofocus and manual focusing, a photographing lens movable independently of the autofocus system, and a photo-interrupter used for measuring the amount of movement of the photographing lens, if the photographing lens is moved accidentally, it is possible to read out how much the photographing lens is spaced from an in-focus position but impossible to read a subject-to-camera distance.

Accordingly, when it is desired to use such a camera to carry out flash photography in a dark place or flashmatic fill-in flash photography, it is impossible to automatically input information upon the distance to a subject and therefore to execute automatically controlled flash photography.

Fourth, in general, the amount of protrusion of a lens barrel is made large when a subject to be photographed is located at a short distance, but is made small when the subject is located at a long distance. Also, in the case of a typical zoom lens, the amount of protrusion of its lens barrel is larger at a wide-angle (WIDE) position than at a telephoto (TELE) position. Therefore, it is preferable that the above motor drive-type autofocus camera having a lens shutter and a TTL viewfinder be arranged such that when the camera is not in use, the lens barrel is reset to the most inward position, for example, an initial position.

It is therefore a first object of the present invention to provide an autofocus camera in which it is possible to substantially shorten the period required for the visual field in the viewfinder to be blocked, in which a sequence of photographic operations can be executed rapidly and with reduced electrical power, and which has a reduced size.

It is a second object of the present invention to provide an autofocus camera which, if distance measurement is impossible and a subject is bright, can set its photographing lens to one of several predetermined long distances or to infinity since a bright subject such as a mountain, sea, sky or clouds is commonly located at a long distance from the camera, and which, if distance measurement is impossible and a subject is dark, can fix the photographing lens to one of several predetermined short distances since a dark subject is often photographed using a flash.

It is a third object of the present invention to provide an autofocus camera which enables automatically controlled flash photography by automatically temporarily moving a photographing lens to infinity or the closest distance prior to effecting automatic adjustment of focus and measuring the distance between the subject and the camera with reference to infinity or the closest distance to use the measured value as the distance information for flash photography.

It is a fourth object of the present invention to solve various other problems involved in an autofocus camera, particularly those connected with the amount of protrusion of a lens barrel of a zoom lens for use in the autofocus camera.

SUMMARY OF THE INVENTION

To achieve the first object, in accordance with a first aspect of the present invention, there is provided a motor-drive type autofocus camera having a lens shutter and a TTL viewfinder. The camera is arranged to move a mirror in association with a single-frame film-winding operation to block light to be transmitted to a film chamber, stop the film winding operation upon completion of the downward movement of the mirror, open the lens shutter, and then wind the remaining portion of the frame of the film.

To achieve the second object, in accordance with a second aspect of the present invention, there is provided an autofocus camera of the motor-drive type that includes an automatic focus adjustment apparatus, a lens shutter and a TTL viewfinder. The autofocus camera according to the second aspect is arranged such that, if the automatic focus adjustment apparatus cannot provide a measure of distance, on the basis of information supplied from an exposure measurement device, the photographing lens is fixed at infinity or a predetermined long distance closer than infinity when a subject is bright but, when it is dark, at a predetermined short distance.

To achieve the third object, in accordance with a third aspect of the present invention, there is provided an autofocus camera of the motor-drive type that includes an automatic focus adjustment apparatus, a lens shutter and a TTL viewfinder as well as a flash control device. The automatic focus adjustment apparatus causes the photographing lens to be moved to either infinity or an initial position at the closest distance prior to executing an autofocus operation and then drives the photographing lens for focusing purposes. A photo-interrupter provides information upon the distance to an in-focus position on the basis of information upon the distance between infinity or the closest position and the in-focus position. The flash control device enables flash photography based on the distance information provided by the photo-interrupter.

To achieve the fourth object, in accordance with a fourth aspect of the present invention, there is provided an autofocus camera of the motor-drive type that includes a lens shutter and a TTL viewfinder. The autofocus camera according to the fourth aspect is arranged to reset a lens barrel to an initial position in synchronization with a film rewinding operation in response to a film-rewind start signal.

The initial position is a position at which the photographing lens is retracted into a camera body by the maximum amount.

BRIEF DESCRIPTION OF THE DRAWINGS

A better understanding of the present invention may be gained from the following detailed description when read in connection with the accompanying drawings, in which:

FIGS. 4a to 4e are respectively flowcharts showing in detail the operations of the camera according to the embodiment of the present invention.

DESCRIPTION OF THE PREFERRED EMBODIMENT

A preferred embodiment of the present invention will be described below in detail with reference to the accompanying drawings.

Figure 1:
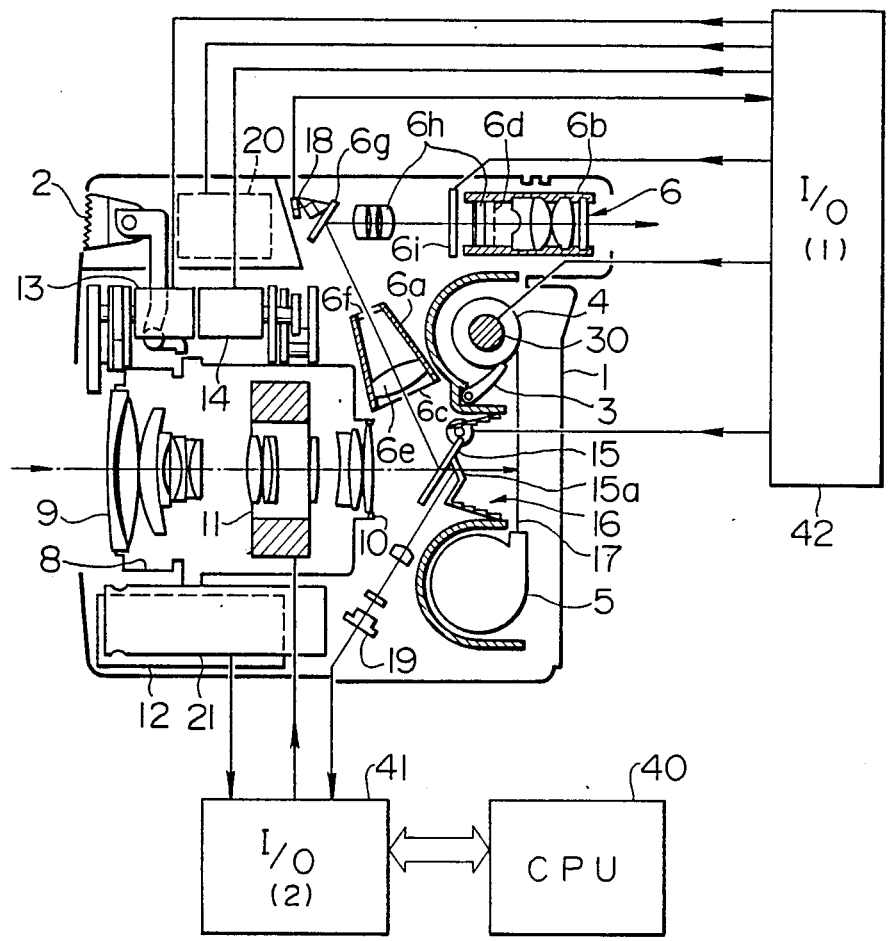
FIG. 1 is a block diagram showing the arrangement of essential components and control circuits for a camera according to a preferred embodiment of the present invention.

FIG. 1 is a block diagram showing the arrangement of essential components and control circuits for a camera according to a preferred embodiment of the present invention.

The present control circuit is constituted by I/O circuits 41, 42 and a CPU 40 which are illustrated as being outside of a camera body 1 for the sake of easy understanding but which in actuality are accommodated in the camera body 1. The camera body 1 has a vertical configuration, and a light transmitting window 2 for a built-in flash unit 20 is provided at an upper portion of the front of the camera body 1.

A dark box 16 which forms part of a film chamber is provided in the camera body 1 at its rear portion, and a film 17 pulled out of a patrone 5 is wound around a spool 4 while being pressed thereonto by a film stabilizing mechanism 3. A film winding and rewinding motor 30 is incorporated in the spool 4.

A mirror 15 is provided in association with the dark box 16. The mirror 15 is driven by a motor (not shown) to move between a first position and a second position. At the first position (illustrated), the mirror 15 is adapted to prevent light passing through a photographing lens 9 and a shutter 11 from reaching the surface of the film 17 and to transmit the light to a viewfinder optical system 6. At the second position (upward position), the mirror 15 is adapted to prevent light passing through the photographing lens 9 and the shutter 11 from reaching the viewfinder optical system 6 and to allow the light to be transmitted to the surface of the film 17.

A shutter 11 is a solenoid-operated chargeless shutter which is arranged to have its shutter blades opened and closed by the forward and reverse motions of a small motor (not shown). In a normal state, the shutter 11 is opened.

The mirror 15 also functions to prevent light from leaking from the photographing lens 9 or the viewfinder optical system 6. The mirror 15 is secured in a pivotable mirror frame (not shown) which also serves to block light.

A portion of the light reflected by the mirror 15 and transmitted to the viewfinder optical system 6 is made incident upon a light measuring section 18 through a viewfinder mirror 6g which will be described later. When the mirror 15 is located at the first position, a portion of the light transmitted through the mirror 15 is reflected by an auxiliary mirror 15a and made incident upon a distance measuring section 19.

The above-mentioned viewfinder optical system 6 has a TTL type arrangement which comprises a first viewfinder cylinder 6a having a first focal plane 6c, a second viewfinder cylinder 6b having a second focal plane 6d, and a condenser lens 6e disposed in the vicinity of the first focal plane 6c.

The first viewfinder cylinder 6a is combined with the condenser lens 6e and a cover glass plate 6f which is opposed thereto to form a hermetic structure, thereby preventing dust from sticking to the inner surface of the condenser lens 6e.

The above-mentioned viewfinder mirror 6g serves to bend an optical path in the viewfinder optical system 6 in order to reduce the size thereof. A relay lens system 6h constituted by two lens groups is disposed between the viewfinder mirror 6g and the second focal plane 6d.

An eyepiece shutter (hereinafter referred to as "E shutter") 6i is incorporated in the relay lens system 6h. The E shutter 6i is used to prevent the exposure of the film 17 from being adversely affected by any extremely small intensity of light which may enter through an eyepiece aperture (not shown).

Should any dust stick to the outer surface of the condenser lens 6e disposed in the vicinity of the first focal plane 6c, the film stabilizing mechanism 3 may be removed to allow cleaning of the contaminated surface of the condenser lens 6e through an opening (not shown) located behind the film stabilizing mechanism 3.

The photographing lens 9 is accommodated in a lens barrel 8 which, in turn, is secured to the camera body 1 at an engagement portion 10.

The shutter 11 is provided in the barrel 8. The shutter blades (not shown) of the shutter are normally urged in the shutter opening direction by a spring means (not shown). The shutter blades are adapted to be closed against the urging force of the shutter means by the forward driving of an associated motor (not shown), and are retained in the closed state by the engagement of a hook (not shown).

When the motor is reversed, the hook is disengaged to allow the shutter blades to operate in the shutter opening direction by the urging force of the spring means. Accordingly, the operating period of the motor in the shutter opening operation may be shortened.

A battery 12 is a power source for supplying electricity to each component.

An autofocus driver 13 is responsive to signals supplied through an I/O circuit 42 which forms part of the control circuit for driving the photographing lens 9 for adjustment of the focus thereof. A power zoom driver 14 is likewise responsive to signals supplied through the I/O circuit 42 for driving the photographing lens 9 for zooming purposes.

The built-in flash unit 20 and a capacitor 21 associated with the flash unit 20 are used for flash photography.

The operation of the preferred embodiment having the above-described arrangement will be described below in detail with reference to FIG. 2 and FIG. 3 which respectively represent a flowchart and a timing chart showing the basic operation of the present camera described above.

Prior to a shutter release operation (Step 0 of FIG. 2), either a telephoto (TELE) zooming button (not shown) or a wide-angle (WIDE) zooming button (not shown) is operated to drive the photographing lens 9 through the power zoom driver 14 to thereby effect zooming toward a desired focal length.

Figure 2:
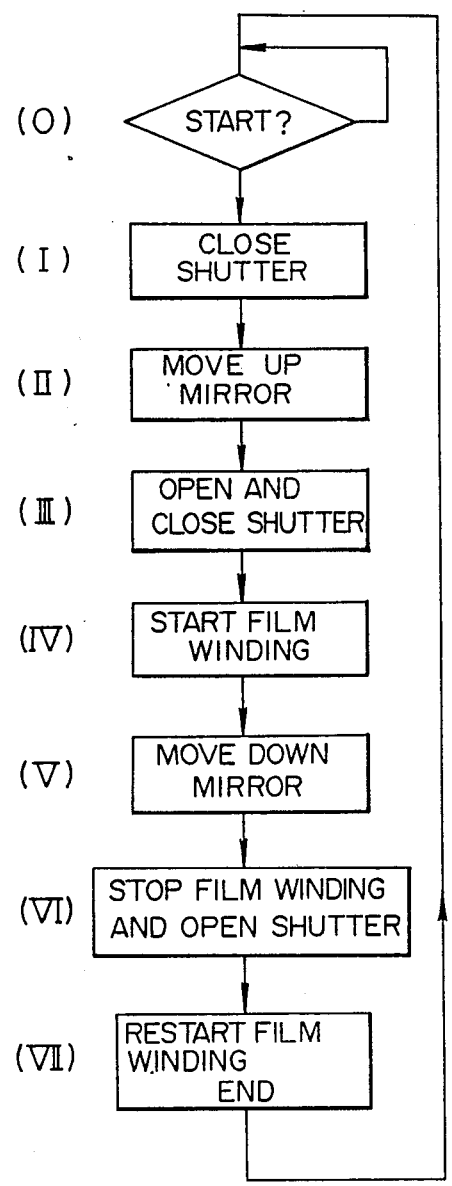
FIG. 2 is a flowchart showing the basic operation of the camera according to the embodiment of the present invention.
Figure 3:
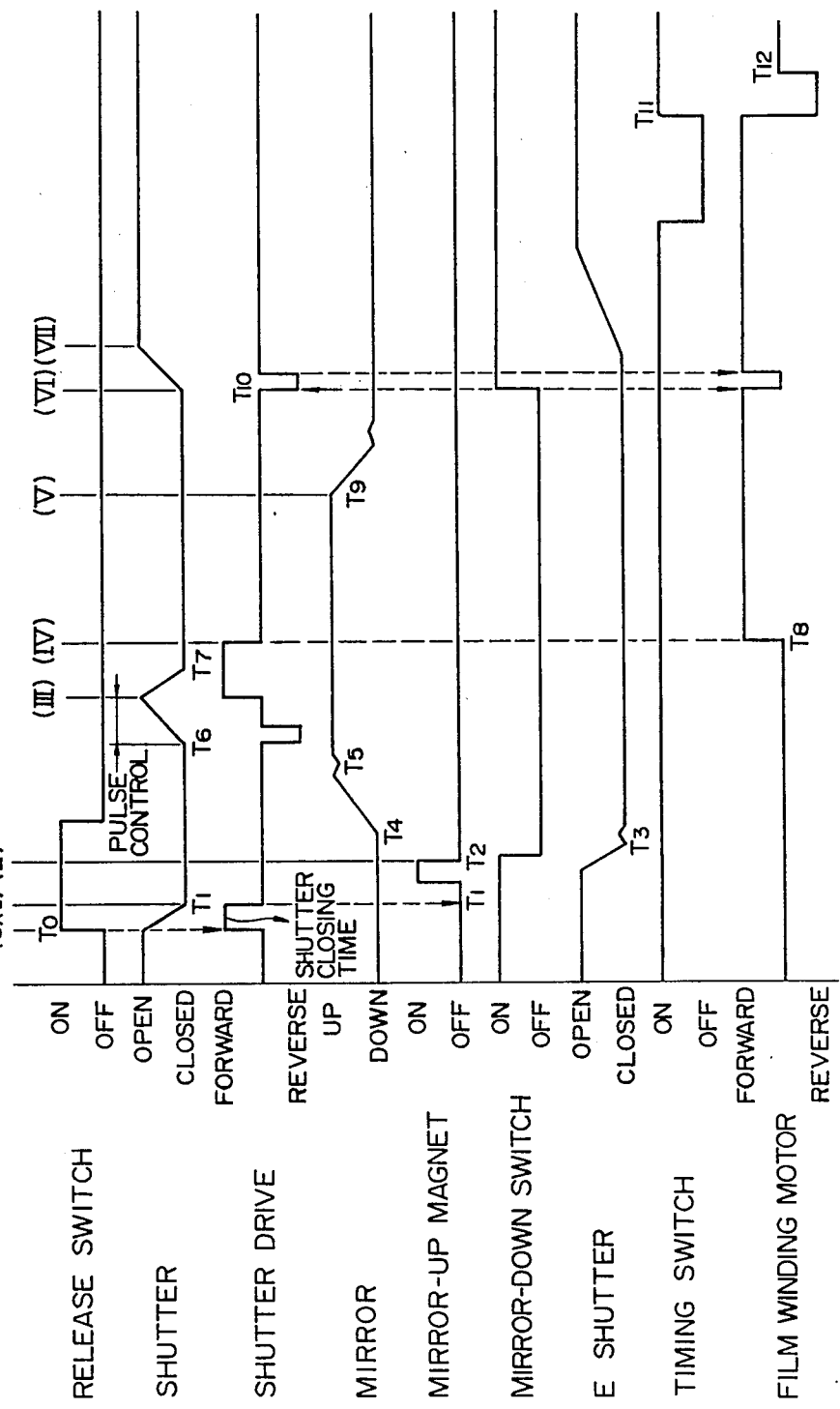
FIG. 3 is a timing chart showing the operations of the camera according to the embodiment of the present invention.
Figure 4B:
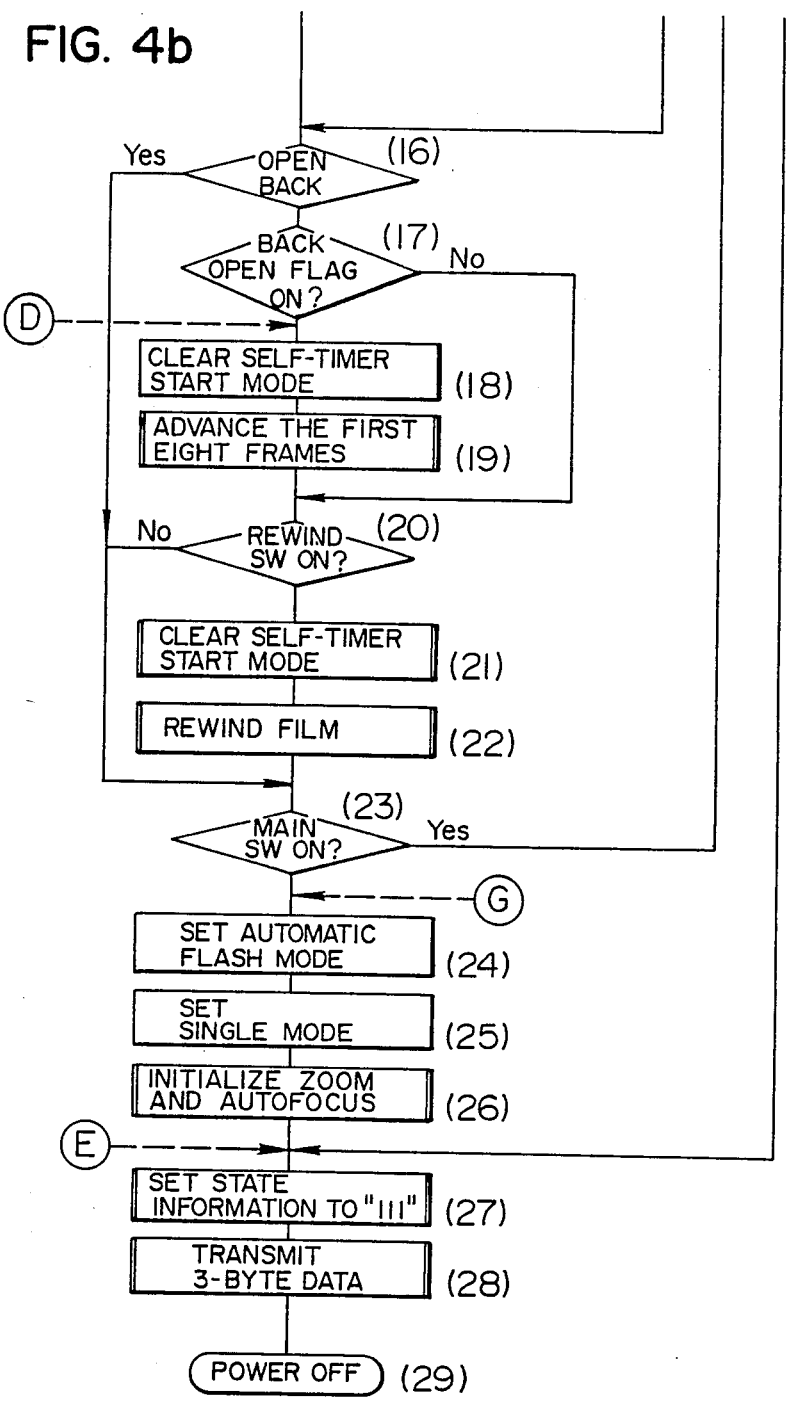
Figure 4C:
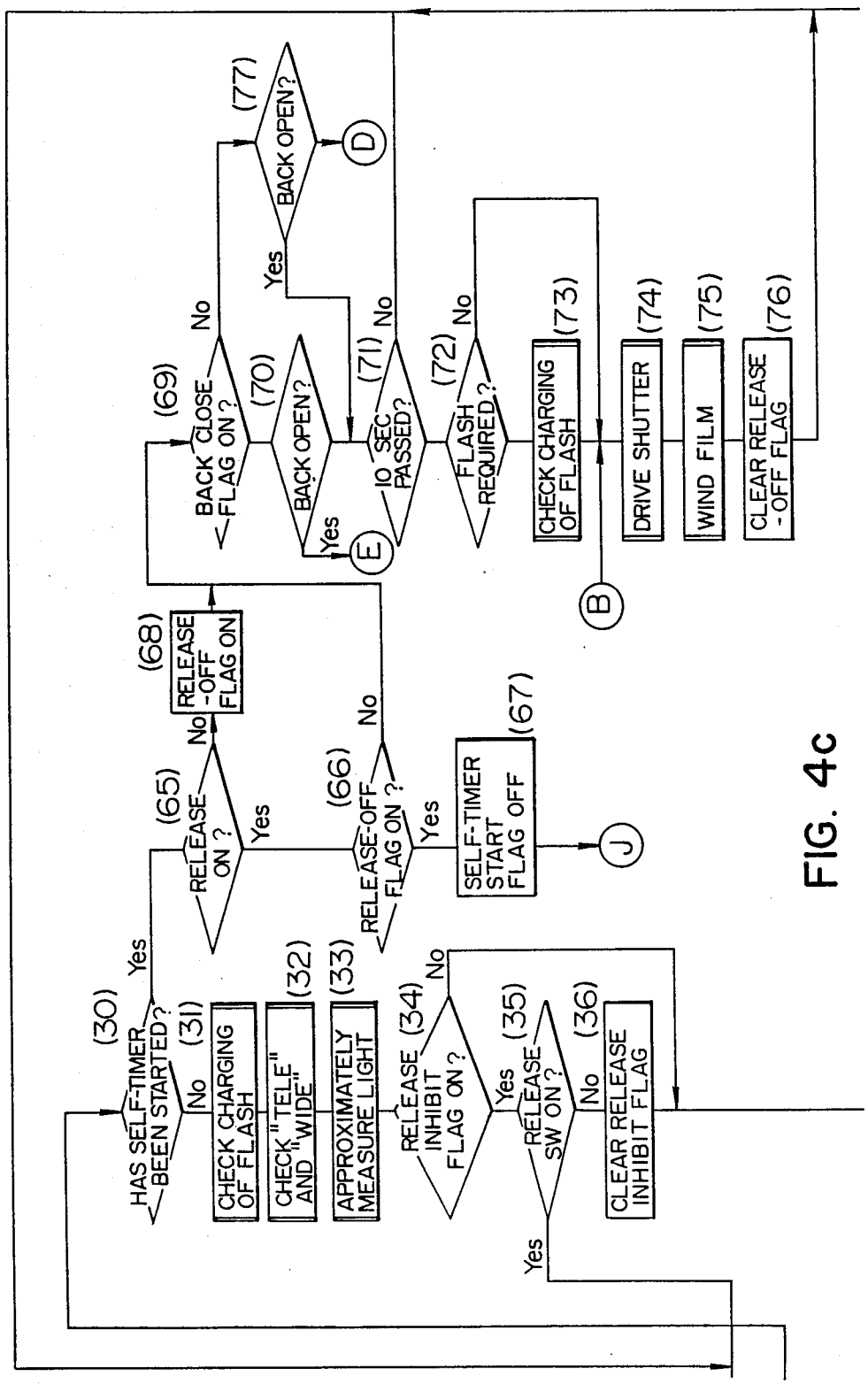
Figure 4D:
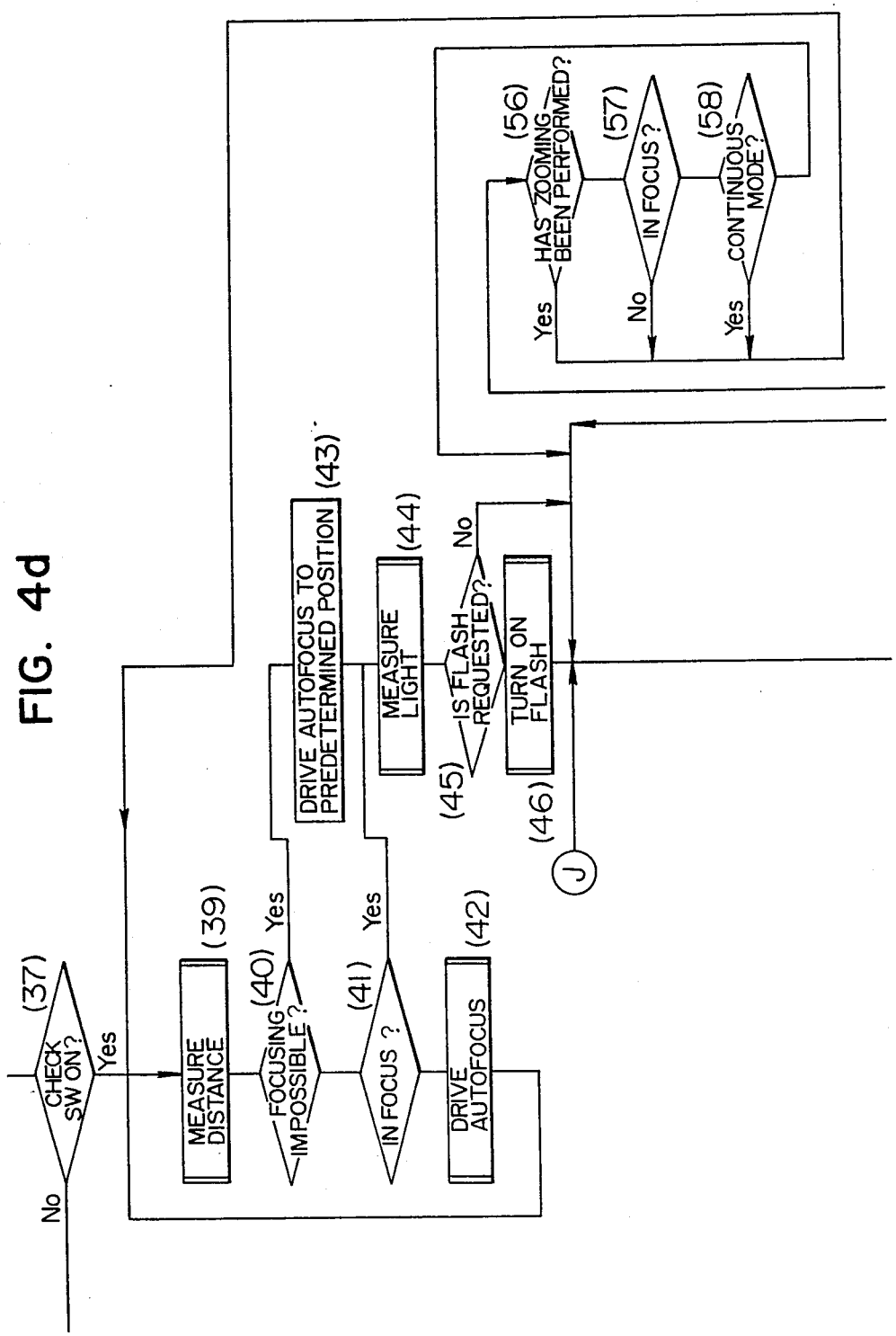
Figure 4E:
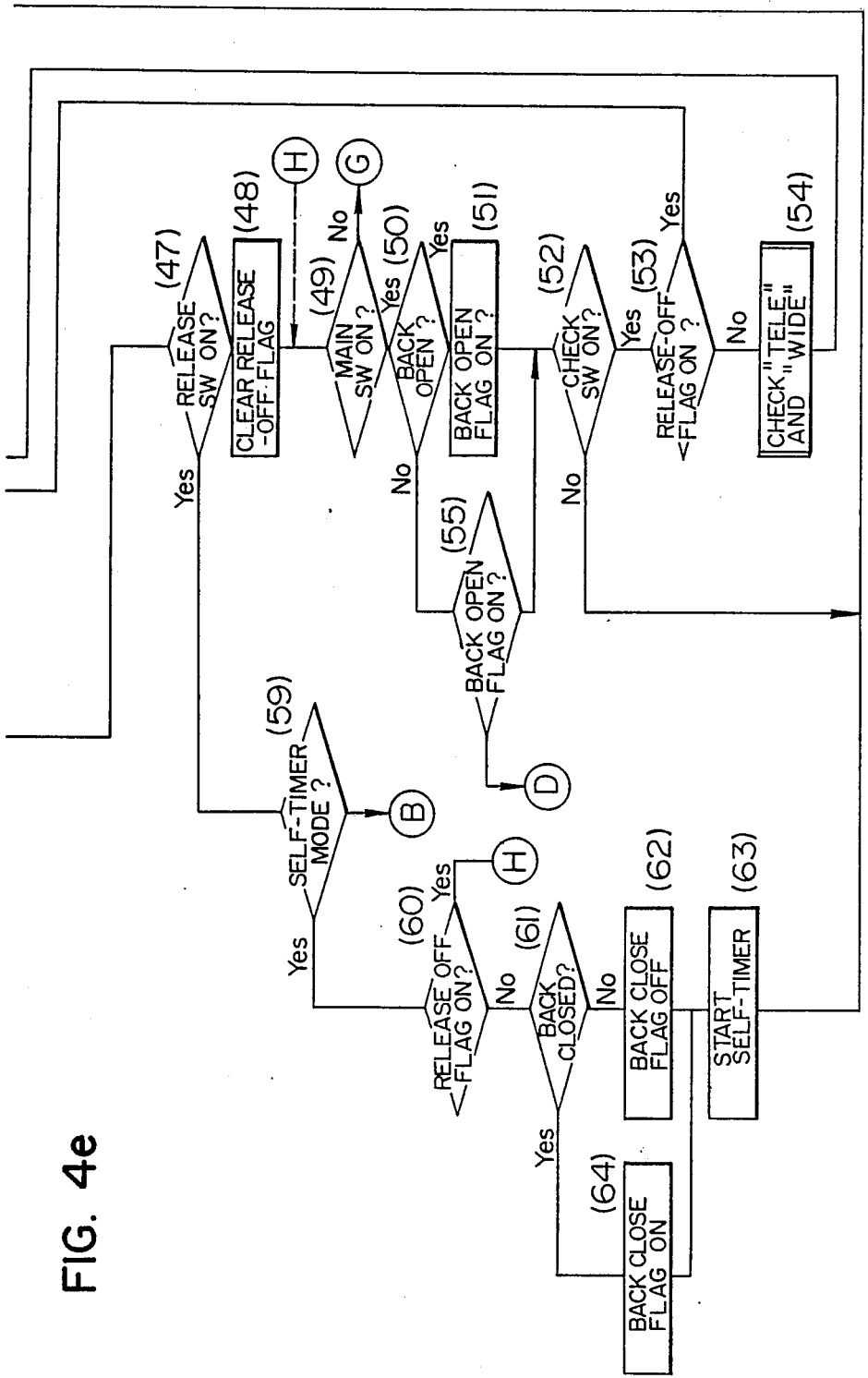

Step 0 of FIG. 2 and Time T0 in FIG. 3

After the shutter release operation, a focusing operation is effected by the autofocus driver 13 on the basis of values obtained from arithmetic operations which have been performed using optical information supplied from the distance measuring section 19.

Step I of FIG. 2 and Time T1 in FIG. 3

After the focusing operation, the shutter motor (not shown) is driven forwardly to close the shutter 11.

Step II of FIG. 2

The aforementioned frame of the mirror 15 is engaged with a mirror-up magnet Mg (not shown). When the mirror-up magnet Mg is energized at time T2, the mirror 15 is moved up (from time T4 to time T5).

When the mirror 15 is in its upward position, the light coming through the viewfinder optical system 6 may expose the film 17. For this reason, before the upward movement of the mirror 15 is initiated, the E shutter 6i shown in FIG. 1 is closed by a mechanism (not shown) at time T3.

Step III of FIG. 2 and Time T6 to T7 in FIG. 3

After the mirror 15 has reached its upward position, the shutter blades are opened and closed under the control of an ordinary control system used with a programmed lens shutter. Specifically, from time T6 to time T7, the shutter 11 is opened by the reverse driving of the shutter motor and, after exposure to a predetermined amount of light, the shutter 11 is closed by the forward driving of the shutter motor.

Step IV of FIG. 2

After the above shutter operation, the film winding and rewinding motor 30 is actuated in the forward direction at time T8 to initiate winding of the exposed frame of the film 17.

Step V of FIG. 2

During the initial period of this film winding operation and at time T8, the mirror 15 is moved downwardly by a mechanism (not shown) in association with the operation of the film winding mechanism (time T9).

After the mirror 15 has been moved down, the E shutter 6i is interlockingly opened.

Step VI of FIG. 2

After the mirror 15 has been moved down, the shutter motor is reversed to open the shutter 11.

During the operation of the film winding and rewinding motor 30, if the shutter motor is caused to open the shutter 11, electricity must be supplied to both motors. As a result, the normal operation of both motors could not be maintained since an excessive load may be applied to the power source. For this reason, while the shutter motor 30 is being operated, the energization of the film winding and rewinding motor is temporarily stopped at time T10. In other words, during the course of the film winding operation, the energization of the film winding and rewinding motor 30 is temporarily stopped and the shutter motor is actuated to open the shutter 11. Since the duration of this stop interval is short, the user is given the feeling that the film winding operation is being smoothly executed.

Step VII of FIG. 2

The energization of the film winding and rewinding motor 30 is restarted to wind the rest of the exposed frame of the film 17, and the film winding operation is completed at time T11.

The above film winding operation is completed when a predetermined amount of rotation has been detected through ON-OFF operations of a timing switch (not shown). In this embodiment, the film winding and rewinding motor 30 is stopped at a predetermined position by application of a reverse brake torque.

The detailed flow of the processings executed by the CPU 40 which forms part of the control circuit will be described below with reference to FIGS. 4a to 4e.

In this embodiment, in its normal state, even if a main switch (not shown) is held in the on state, the power is off, that is, no electricity is supplied to the CPU 40. When the power source is turned on by an external switch input, the program is reset and started.

Step 1

The program is reset and started.

Step 2

The internal state of the CPU 40 is initialized and the I/O ports 41 and 42 are initialized.

Step 3

The state of a test switch (not shown) is checked. If the test switch is on, the process proceeds to a test mode processing routine of Step 4.

Step 4

In the test mode processing routine, adjustment of autofocus and auto-exposure systems, writing of corrected data, checking of a flexible wire which carries the CPU 40, and so on are executed. Since this step 4 is provided in a manufacturing process for the sake of convenience, the test switch is set to an off state during use of the camera. Therefore, the process necessarily proceeds from Step 3 to Step 5. When the answer to the judgment in the aforesaid Step 3 is "NO", the process proceeds to Step 5.

Step 5

In this step, 3 bytes of data is read from a circuit (not shown) which serves as both a memory and a display (hereinafter referred to as "auto-date module") and the 3 bytes are stored in RAM of the CPU 40. The information stored in this circuit is position information on the photographing lens 9, information on the selected photographing mode of the camera, information representative of whether or not the back (not shown) of the camera is open, and state information which will be described below. Since all the information is written beforehand in the auto-date module, it is supported by the auto-date module which serves as a backup memory even if the power supply of the main CPU 40 is turned off.

Step 6

It is determined whether or not the present ON operation of the power source is based on the ON operation of the main switch alone. The power source is adapted to be turned on by any one of on-off switching of the main switch, closing of the back, the ON operation of a rewind switch (not shown), or the like. If it is determined that the power source has been turned on by the ON operation of the main switch alone, the process proceeds to Step 7.

Step 7

The state information alone of all the information which has been read from the auto-date module, is set to "001" in preparation for a state restoring operation which is to be executed in Step 11. If it is determined that the present ON operation of the power source (Step 6) is based on the ON operation of the main switch, the process jumps from Step 6 over Step 7 to Step 8.

Step 8

An additional 2 bytes of data is read from the auto-date module. This data is used for correction of arithmetic operations upon both light measurement and distance measurement in a subsequent process. Such data is written into the auto-date module during the test mode processing routine of Step 4 which is executed in a camera manufacturing process.

Step 9

The state of the battery 12 in the power-on state is checked. A voltage is supplied to the motor for about 1 ms not long enough to affect the state of the camera and the state of the voltage drop in the power source is checked.

The state of the battery 12 is divided into the following three stages. In stage (1), normal operation is possible; in stage (2), although normal operation is possible, battery replacement will be required soon; in state (3), normal operation is impossible. In stage (2), an instruction to blink a battery sign is transferred to the auto-date module to warn the photographer. In stage (3), the battery sign and all other displays are turned off, and the process jumps to Step 29 in which the power source is turned off, thus completing the operation. In stage (1) or (2), the process proceeds to Step 10.

Step 10

The DX code of the film 17 which has been loaded in the camera is read and stored in the RAM of the CPU 40 so that it may be used for arithmetic operations in subsequent processes. The data based on the DX code is transferred in order to control the lighting period of an exposure lamp (not shown) when the auto-date module operates as a data back to print a date on a frame of the film 17.

Step 11

The camera is set to its standard state on the basis of the state information which has been read or set in Step 5 or 7. The state information "001" which was set in Step 7 is used to set the autofocus system to infinity ($\infty$) and the zoom system to its wide-angle (WIDE) position. The state of each of the autofocus and auto-exposure systems immediately before a power-off operation is stored in the form of a 3-bit code, and the thus-stored code is reproduced to return the camera to its standard state.

If the power source is to be turned off in the standard state, the process proceeds to Step 27, in which the state information is set to "111". In Step 28, this state information is written into the auto-date module by 3-byte transfer and, in Step 29, the power source is turned off. Accordingly, if the state information has already been set to "111", the process proceeds from Step 11 to Step 12 without executing any processing.

Step 12

In order to allow for a case where the state is not restored, whether or not the mirror 15 has been moved down is checked. If the mirror 15 has been moved down, the process jumps over Step 13 to Step 14. If the mirror 15 has not been moved down, the process proceeds to Step 13.

Step 13

A shutter opening operation, a film winding operation and a shutter closing operation are sequentially executed and then the mirror 15 is moved down.

Step 14

The state of information is set to "000".

Step 15

The state information "000" is transmitted to and stored in the auto-date module. "000" initializes the possible states of the mechanism of the camera, particularly to cope with the accidental disconnection of the power source due to, for example, a sudden dropping of the battery 12 from the camera body 1 in the power-on state.

Step 16

The state of the back is checked. If the back is open, the process jumps to Step 23 in which the state of the main switch is checked. If it is confirmed that the back is closed, the process proceeds to Step 17.

Step 17

Information representative of the state of the back which is contained in the 3 bytes of data read in Step 16 is checked. If the back is open, the process proceeds to Step 18 and then to Step 19. If not, the process jumps over Steps 18 and 19 to Step 20.

The information representative of the state of the back which is contained in the 3 bytes of data is used to allow the first eight frames to be advanced as a preliminary leader portion after the film 17 has been loaded into the camera body 1. In the OFF state of the main power source, that is, even if no power is supplied to the CPU 40, the state carried by the information is set in the auto-date module by opening the back. This state which has been set in this manner is not cleared at the next closing operation of the back. After completion of the advancement of the eight frames, in Step 19, that state is cleared by the CPU 40 for the purpose of subsequent writing.

Step 18

If it is determined in Step 17 that a back-open flag is on, a self-timer start flag is cleared in Step 18. This step of clearing the self-timer start flag is inserted in the program at this position on the supposition that the back may be opened and closed after the operation of a self-timer has been started. Should the process jump from the start step to this step, this step is ignored.

Step 19

The first eight frames of the film 17 are advanced as a preliminary leader portion. Upon completion of this film advancement, the back-open flag is cleared.

Step 20

The state of a film rewind switch (not shown) is checked.

If the back is open, the film 17 need not be rewound. Therefore, if it is determined that the back is open, the process jumps over Steps 20, 21 and 22 to Step 23.

Step 21

The self-timer start flag is cleared. As described above in Step 18, Step 21 is inserted on the supposition that the film rewind switch may be turned on after the operation of the self timer has been started.

Step 22

The film 17 is rewound. The state information representing the fact that the film 17 is being rewound is transmitted to the auto-date module, and the thus-stored state information is held therein during the film rewinding operation. If the battery 12 should come off the camera body 1 during the film rewinding operation, this film rewinding operation can be completed since the same state can be restored by the next ON operation of the power source.

The operation of a perforation switch (not shown) is checked, and the frames of the film 17 which are being rewound are counted down by a counter and are simultaneously displayed at the auto-date module.

The film rewinding operation referred to in Step 22 is a forced film rewinding operation which is initiated through a manual switch. However, an automatic film rewinding operation which is performed on the basis of detection of the film end during an ordinary film winding operation is the same as the operation referred to in Step 22.

Step 23

The state of the main switch of the camera is checked. If it is determined that the main switch is on, the process proceeds to Step 30. If it is determined that the main switch is off, the process proceeds to Step 24 and then to Step 25.

Steps 24 and 25

An automatic flash mode and a single mode are selected from among the flash operation modes and the photographing modes all of which are incorporated in the camera, and these two modes are set in the RAM of the CPU 40.

The flash operation modes are the automatic flash mode as well as a flash-off mode and a slow shutter speed sync flash mode, and the photographing modes are the single mode as well as a continuous mode, a self-timer mode and a continuous self-timer mode.

These modes can be changed by turning on corresponding push switches which are provided at the auto-date module, and information representative of the selected modes is set in the previously described 3 bytes of data. Therefore, at the time of receipt of the 3 bytes of data in the previously mentioned Step 5, the relevant information is read out and identified by the CPU 40.

Such mode information can be changed by the CPU 40 itself. For example, as in the case of Step 24 or 25, the automatic flash mode or the single mode is written into corresponding addresses on the RAM of the CPU 40 and, in turn, is transferred to the auto-date module on a 3-byte basis and written thereinto.

Step 26

The focus position of the lens 9 is moved to the infinity ($\infty$) position of the lens barrel 8 and the focal length of the lens 9 is shifted to a wide-angle (WIDE) position.

Figure 5:
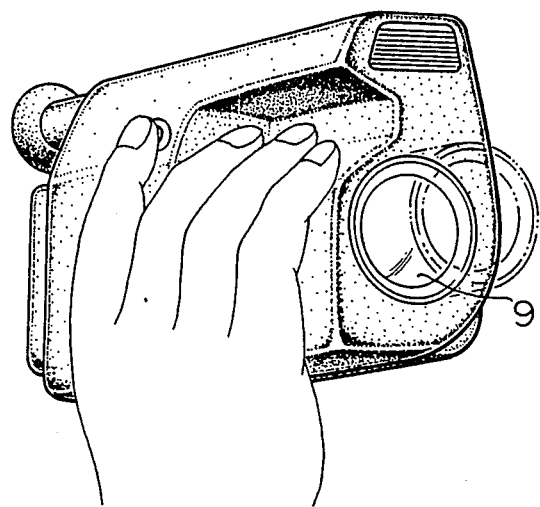
FIG. 5 is a diagrammatic perspective view of the camera according to the embodiment of the present invention.

The circle shown by a two-dot chain line in FIG. 5 represents the position which is occupied by the front of the lens 9 when it has protruded by the maximum amount. In this step, the lens 9 is set to an initial position which is occupied by the front of the lens 9 when it has been retracted by the maximum amount.

In Steps 24, 25 and 26, the state of the camera is initialized when the main switch is turned off.

Step 27

The state information is set to "111" as described previously in Step 11.

Step 28

This state information as well as another information is transmitted to the auto-date module on a 3-byte basis and is stored therein.

Step 29

The power source is turned off. If the state information "111" is stored in this manner, the state information which is obtained as a result of the receipt of 3 bytes of data upon the next ON operation of the power source is set to "111". Therefore, the process can immediately proceed to a predetermined step without the need to execute any state restoring operation in Step 11.

Step 30

If it is determined that the main switch is on in the aforesaid Step 23, the process proceeds to this step 30 in which it is determined whether or not the self-timer operation has been started.

In a case where the process sequentially proceeds to this step, it then proceeds to the following Step 31 since, in this case, the answer is normally "NO". However, after the self-timer operation has been started, the process passes this step during the execution of a wait loop. Therefore, it is necessary to determine whether or not the self-timer has started. If the self-timer has started and the answer is "YES", the process proceeds to Step 65 but, if not, the process proceeds to Step 31.

Step 31

The state of charging of the flash is checked. If the flash-off mode has been selected from among the flash operation modes, this step is jumped. If the automatic flash mode and the slow shutter speed sync flash mode are selected, the state of charging is checked. If the flash has not yet been charged, the flash is completely charged.

Step 32

The states of zoom driving switches for telephoto (TELE) zooming and wide-angle (WIDE) zooming are checked. If either of these switches is on, the lens 9 is driven so that its focal length is varied to a focal length which corresponds to the selected switch. Information representative of the position of the lens 9 which has been thus driven is compressed to 3 bytes of data and is stored in the auto-date module as the position information of the lens 9. This position information is utilized for arithmetic operations upon light or distance measurement.

Step 33

Before it is determined whether the photographing lens 9 is in focus, light is approximately measured in order to detect a preset position which is referred to if focusing is impossible when the lens 9 is to be automatically focused on the basis of the distance measurement which is performed in Steps 39 to 44.

Accurate measurement of light is executed after the completion of the focusing operation. In this manner, the present camera is arranged such that, if it is determined that automatic focusing is impossible as a result of distance measurement, a different preset position can be selected according to the brightness of a subject.

Step 34

The state of a release inhibit flag is checked. The release inhibit flag is used so that, when the single, self-timer or continuous self-timer mode is selected from among the photographing modes, execution of the next operation may be inhibited even if the release switch is kept pressed at the time of completion of a sequence of operations including individual shutter operations.

The step 34 is executed in a case where the process loops back to this step after completion of a sequence of shutter operations. If the process proceeds sequentially from the start step to this step, the answer is "NO" and the process proceeds to Step 37. If the release inhibit flag has been set up, the answer is "YES" and the process proceeds to Step 35.

Step 35

It is determined whether or not the release switch is on. If the release switch is on with the release inhibit flag being set up, the answer is "YES". The process returns to Step 16 and waits for the release switch to be turned on.

Step 36

If it is determined that the release switch is off in the above Step 35, the release inhibit flag is cleared.

Step 37

It is determined whether or not a check switch (not shown) is on. If the check switch is on, the process proceeds to Step 39. If the check switch is off, the process proceeds to Step 27 in which the state information is set to "111". Then, in Step 28, this state information is transmitted on a 3-byte basis, and the power source is turned off.

In this manner, even if the main switch is on, the power source of the present camera is normally off and the CPU is disconnected from the power source when the check switch, a switch for turning on the power source, or the like is off. Since a display is provided by the auto-date module, this state is impossible to externally discriminate and, in addition, electrical energy can be saved.

Steps 39 to 43

An automatic focusing operation is executed by measuring distance and performing arithmetic operations upon the measured distance. Although the amount of movement of the photographing lens 9 is not shown, a photo-interrupter detects this amount and inputs it to a corresponding arithmetic circuit.

As described previously, if it is determined in Step 40 that focusing is impossible, the photographing lens 9, in Step 43, is driven to a predetermined focus position according to the brightness of a subject on the basis of light measurement information which has been provided by the approximate light measurement in Step 33. More specifically, if it is bright, the photographing lens 9 is driven and set to infinity or a predetermined focus position which is near infinity. If it is dark, the photographing lens 9 is driven and set to the closest position or a predetermined position which is near the closest position.

Step 44

Light at the in-focus position or the preset position is measured, arithmetic operations are performed upon the measured light, and a shutter control time and a flash time control time are determined.

Step 45

It is determined whether or not flashing is required on the basis of the result of the arithmetic operations in Step 44. If required, the process proceeds to Step 46, while if not required, the process jumps over Step 46 to Step 47.

Step 46

An indication representative of the use of the flash unit 20 is turned on.

Step 47

It is determined whether or not the release switch has been turned on. If it is determined that the release switch is on and the answer is "YES", the process proceeds to Step 59. If it is determined that the release switch is off, the process proceeds to Step 48.

Step 48

In this step, a release-off flag is cleared. More specifically, since this flag functions after the operation of the self-timer has been started, the flag is temporarily cleared if the operation of the self-timer is not started. The operation of the self-timer is started by turning on the release switch and, even if a user stops pressing the release switch, the self-timer operation continues. If the release switch is again turned on, this self-timer operation stops. The release-off flag is associated with the starting and stopping of the self-timer operation.

Step 49

It is determined whether the main switch is on. This step is inserted so as to cope with a case where the main switch is turned off with the check switch being on. If the main switch is off, the process proceeds to G, that is, Step 24 and processings similar to those which are performed when it is determined in Step 23 that the main switch is off. Thereafter, the power source is turned off.

Step 50

The state of the back is checked. If the back is open, the process proceeds to Step 51, while if the back is closed, the process proceeds to Step 55.

Step 51

A back open flag is set. If it is determined that the back open flag is off ("0"), the process proceeds to Step 52. If it is determined that the back open flag is on ("1"), the process proceeds to Step 55.

Step 55

The state of the back open flag is checked. If the back open flag is off ("0"), the process proceeds to Step 52. If the back open flag is on ("1"), this indicates that the opening and closing operation of the back has been executed. Therefore, the process proceeds to D, that is, Step 18 in which the self-timer start flag is cleared, and then to Step 19 in which the first eight frames are advanced as a preliminary leader portion.

Step 52

The state of the check switch is checked. If the check switch is on, the process proceeds to Step 53, while if the check switch is off, the process returns to Step 16 for checking the state of the back.

Step 53

The state of the release-off flag is checked. This step functions when the self-timer start flag is set up. If the release-off flag is off, the process exits from this loop and proceeds to Step 54. If the release-off flag is on, the process returns to Step 47.

Step 54

The state of each of the zoom drive switches for zooming between wide angle (WIDE) and telephoto (TELE) is checked. This step is inserted so as to enable zooming to be carried out with the check switch being pressed or when the lens 9 is in focus. If zooming is performed, the information relative to this zooming is set, and the process proceeds to Step 56.

Step 56

It is determined whether or not zooming has been carried out in the above-described checking of zooming between telephoto and wide-angle in Step 54. If any zooming occurs and the answer is "YES", the process proceeds to Step 39 so as to again measure distance. If it is determined that no zooming has occurred, the process proceeds to Step 57.

Step 57

Whether the lens 9 is in focus is checked. When the lens 9 has reached an in-focus position, the process proceeds to Step 58. If the lens 9 is out of focus and the answer is "NO", the process exits from this loop and returns to Step 39 in which distance is again measured.

Step 58

It is determined whether or not the continuous mode is selected. If the continuous mode is selected and the answer is "YES", the process returns to Step 39 in which distance is again measured. If any mode other than the continuous mode is selected, that is, if any one of the single mode, the self-timer mode and the continuous self-timer mode is selected, the process returns to Step 47.

In the continuous mode mentioned above, if the check switch is on, distance and light are repetitively measured irrespective of whether or not focusing is possible so as to consistently follow the movement of a subject.

In each of the modes other than the continuous mode, if the check switch is on, distance and light are repetitively measured even if focusing is impossible. However, when the lens 9 reaches an in-focus position, the states of both the autofocus and auto-exposure systems do not vary and the process waits for the release switch to be turned on. In other words, the autofocus and auto-exposure systems are respectively held in states called "AF LOCK" and "AE LOCK". As described previously, in Step 47, the state of the release switch is checked and, if the release switch is turned on, the process proceeds to Step 59.

Step 59

Whether the self-timer mode or the continuous self-timer mode has been selected is checked.

If either of these modes is selected, the process proceeds to Step 60. If either the single mode or the continuous mode is selected, the process proceeds to B, that is, Step 74 in which the shutter 11 is driven.

Step 60

The state of the release-off flag is checked. If the release-off flag is on ("1"), the process proceeds to H, that is, Step 49. In Step 49, the state of the main switch is checked as described previously.

If it is determined in Step 60 that the release-off flag is off ("0"), the process proceeds to Step 61.

Step 61

The state of the back is checked. If the back is open, the process proceeds to Step 62, while if the back is closed, the process proceeds to Step 64.

Step 62

The back-close flag is turned off ("0") and the process proceeds to the next step.

Step 63

The self-timer start flag is turned on ("1"), and the operation of the self-timer is started.

Step 64

The back close flag is turned on ("1"), and the process proceeds to Step 63.

Step 65

If it is determined in the above Step 30 that the self-timer start flag is on ("1"), the process is branched to this step, in which the state of the release switch is checked.

If the release switch is on, the process proceeds to Step 66, while if the release switch is off, the process proceeds to Step 68. After the release-off flag has been turned on ("1") in Step 68, the process proceeds to Step 69.

Step 66

The state of the release-off flag is checked. If the release-off flag is off ("0"), the process proceeds to Step 69. If the release-off flag is on ("1"), this indicates that the release switch was pressed two times in the self-timer mode. Therefore, the process proceeds to Step 67.

Step 67

The self-timer start flag is turned off ("0"), and then the process proceeds to J, that is, Step 47 in which the state of the release switch is checked.

Step 69

The state of the back close flag is checked. It is determined whether the operation of the self-timer has been started in a state where the back is closed or the back is open. If the back close flag is off ("0"), the process proceeds to Step 77, while if the back close flag is on ("1"), the process proceeds to Step 70.

Step 77

The state of the back is checked. If the back is open, the process proceeds to Step 71, in which whether ten seconds has been counted is checked. If the back is closed, the process proceeds to D, that is, Step 18, in which the self-timer start flag is cleared. After this flag has been cleared, the first eight frames are advanced as a preliminary leader portion. More specifically, if the self-timer starts when the back is open and if the back is closed during the counting operation of ten seconds, the operation of the self-timer is stopped and the first eight frames are advanced as a preliminary leader portion.

Step 70

The state of the back is checked. If the back is open, the process proceeds to E, that is, Step 27, in which 3 bytes of information is transmitted to and stored in the auto-date module. Then, the power source is turned off. More specifically, if the self-timer starts when the back is closed and if the back is opened during the counting operation of the self-timer, the operation of the self-timer is stopped. If the back is closed in Step 70, the operation of the self-timer continues and the process proceeds to Step 71.

Step 71

Whether the counter for a self-timer operation has counted ten seconds is checked. If ten seconds has not been counted and the answer is "NO", the process returns to Step 16 and waits for the ten seconds to be counted. If the ten seconds has been counted in Step 71, the process proceeds to Step 72.

Step 72

Whether a flash operation is requested is checked. If requested, the process proceeds to Step 73, while if not, the process proceeds to Step 74.

Step 73

The state of charging of the flash is checked. If required, the flash is charged.

Step 74

The operation of the shutter 11 is initiated.

Step 75

After the operation of the shutter 11 has been completed, a film winding operation is executed. In the film winding operation, whether the film 17 has reached its end is checked. If the winding operation of the camera does not reach its regular end within a predetermined time period after the film winding and rewinding motor 30 has been turned on for the purpose of film winding, the process regards this state as the end of film winding, and automatically proceeds to a film rewinding operation and executes the film rewinding operation similar to that of Step 22.

If the film winding operation is normally completed, the process proceeds to Step 76.

Step 76

The release-off flag which may have been turned on ("1") is cleared ("0"). Then, the process loops back to Step 16.

As is evident from the foregoing, the present invention provides the following advantages in accordance with the respective aspects.

In accordance with the first aspect, the motor-drive type autofocus camera having the lens shutter and the TTL viewfinder is arranged to move a mirror in association with a single-frame film-winding operation, stop the film winding operation upon completion of the downward movement of the mirror, open the lens shutter, and then wind the remaining portion of the frame of the film. Accordingly, the time period for which the visual field in the viewfinder is blocked can be made as short as possible. If the shutter is designed to be opened after the completion of each film winding operation, about 150–200 ms will be required between the moment at which one photographing cycle is completed and the moment at which a scene reappears in the viewfinder. However, in accordance with the present invention, such a time period can be made as short as 50 ms under ideal conditions.

In accordance with the second aspect, the autofocus camera is arranged such that, if distance measurement is impossible, the photographing lens is fixed at either infinity or one of long distances closer than infinity when a subject is bright but, when it is dark, at one of short distances. Accordingly, it is possible to take photographs of a bright scene and to easily achieve flash photography even when it is dark.

In accordance with the third object, even in an autofocus camera which has no manual focusing mechanism and a structure in which the photographing lens may move accidentally as well as a phase-difference distance measurement system arranged to provide a measure of the amount of movement of the lens by means of a photo-interrupter, when it is dark or when it is desired to carry out flash photography utilizing a flashmatic fill-in flash technique, the photographing lens is moved to either infinity or the closest distance prior to execution of an autofocus operation, and a subject-to-camera distance is measured by means of the photo-interrupter with reference to the position to which the lens has been moved, and the thus-measured value can be used as data for flashmatic flash photography.

In accordance with the fourth aspect, in synchronization with a film rewinding operation, the lens barrel is reset from a position which projects from the camera body to an initial position at which the amount of protrusion of the lens barrel is the minimum. Accordingly, it is possible to provide a camera which is easy to store.

What is claimed is:

1. An autofocus camera having a photographing lens, a shutter normally urged in a shutter opening direction and arranged to be opened and closed after it has once been closed prior to a photographing operation, a mirror movable between a view position which allows light passing through said photographing lens and said shutter to be transmitted to a viewfinder optical system and an exposure position which allows light passing through said photographing lens and said shutter to be transmitted to the surface of a film, and an automatic focus adjustment apparatus for automatically adjusting the position of said photographing lens, wherein the improvement comprising a motor-drive control circuit arranged to close said shutter prior to a photographing operation, move said mirror from said view position to said exposure position, cause said shutter to be opened and closed for exposure of said film, cause said film to be wound immediately after completion of the operation of said shutter, move said mirror from said exposure position to said view position, cause said shutter to be opened after the winding of said film has temporarily been stopped, and restart said winding of said film.

2. In an autofocus camera having a photographing lens, a shutter normally urged in a shutter opening direction and arranged to be opened and closed after it has once been closed prior to a photographing operation, a mirror movable between a view position which allows light passing through said photographing lens and said shutter to be transmitted to a viewfinder optical system and an exposure position which allows light passing through said photographing lens and said shutter to be transmitted to the surface of a film, and an automatic focus adjustment apparatus for automatically adjusting the position of said photographing lens, said photographing lens being arranged such that, if said automatic focus adjustment apparatus cannot provide a measure of distance, said photographing lens is fixed at infinity or a predetermined long distance when a subject is bright but, when a subject is dark, at a predetermined short distance.

3. An autofocus camera having a photographing lens, a shutter normally urged in a shutter opening direction and arranged to be opened and closed after it has once been closed prior to a photographing operation, a mirror movable between a view position which allows light passing through said photographing lens and said shutter to be transmitted to a viewfinder optical system and an exposure position which allows light passing through said photographing lens and said shutter to be transmitted to the surface of a film, and an automatic focus adjustment apparatus for automatically adjusting the position of said photographing lens, wherein the improvement comprising a flash control device and a photo-interrupter, said automatic focus adjustment apparatus causing said photographing lens to be moved to one of infinity and an initial position at the closest distance prior to executing an autofocus operation and then driving said photographing lens for focusing purposes, said photo-interrupter providing information upon the distance to an in-focus position on the basis of information upon the distance between infinity or said closest position and said in-focus position, said flash control device enabling flash photography based on the distance information provided by said photo-interrupter.

4. An autofocus camera having a photographing lens, a shutter normally urged in a shutter opening direction and arranged to be opened and closed after it has once been closed prior to a photographing operation, a mirror movable between a view position which allows light passing through said photographing lens and said shutter to be transmitted to a viewfinder optical system and an exposure position which allows light passing through said photographing lens and said shutter to be transmitted to the surface of a film, and an automatic focus adjustment apparatus for automatically adjusting the position of said photographing lens, wherein the improvement comprising a lens barrel for supporting said photographing lens, said lens barrel being reset to an initial position in synchronization with a rewinding operation in response to a rewind start signal.

5. An autofocus camera having an automatic focus adjustment apparatus according to claim 4, wherein said initial position is a position at which said photographing lens is retracted into the body of said camera by the maximum amount.

* * * * *